United States Patent
Hensel et al.

(10) Patent No.: US 12,234,101 B2
(45) Date of Patent: Feb. 25, 2025

(54) TRANSPORT DEVICE AND METHOD FOR DISTRIBUTING A PLURALITY OF SIMILARLY SHAPED AND DIMENSIONED ARTICLES

(71) Applicant: Krones Aktiengesellschaft, Neutraubling (DE)

(72) Inventors: Thomas Hensel, Aying (DE); Martin Bauer, Nussdorf am Inn (DE); Herbert Spindler, Niedermoosen (DE); Juergen Werner, Bruckmuehl (DE); Marcus Seidl, Kienberg (DE)

(73) Assignee: Krones Aktiengesellschaft, Neutraubling (DE)

( * ) Notice: Subject to any disclaimer, the term of this patent is extended or adjusted under 35 U.S.C. 154(b) by 65 days.

(21) Appl. No.: 18/010,345

(22) PCT Filed: Jun. 9, 2021

(86) PCT No.: PCT/EP2021/065420
§ 371 (c)(1),
(2) Date: Dec. 14, 2022

(87) PCT Pub. No.: WO2022/022879
PCT Pub. Date: Feb. 3, 2022

(65) Prior Publication Data
US 2023/0339695 A1    Oct. 26, 2023

(30) Foreign Application Priority Data
Jul. 31, 2020    (DE) .................. 10 2020 120 336.5

(51) Int. Cl.
*B65G 43/08*    (2006.01)
*B65G 47/14*    (2006.01)
(Continued)

(52) U.S. Cl.
CPC ......... *B65G 43/08* (2013.01); *B65G 47/1492* (2013.01); *B65G 47/71* (2013.01);
(Continued)

(58) Field of Classification Search
None
See application file for complete search history.

(56) References Cited

U.S. PATENT DOCUMENTS 4,173,276 A    11/1979  Raudat et al.
4,369,873 A *  1/1983   Heuft ................ B07C 5/367
                                                     198/367

(Continued)

FOREIGN PATENT DOCUMENTS

DE    9204040 U1    5/1992
DE    19514928 A1   6/1996
(Continued)

OTHER PUBLICATIONS

German Application: DE 10 2020 120 336.5 filed Jul. 31, 2020—German Search Report dated Mar. 19, 2021.
(Continued)

*Primary Examiner* — Kavel Singh
(74) *Attorney, Agent, or Firm* — Simmons Perrine Moyer Bergman PLC

(57) ABSTRACT

The invention relates to a transport device (1) and a method for distributing a plurality of similarly shaped and dimensioned articles (10). The transport device (1) comprises an infeed (2) for conveying articles (10) in a mass flow, and a distribution section (3) downstream of the infeed (2), where the distribution section (3) leads into a row transport (4), where the articles (10) are conveyed in at least two separate parallel rows (5). The transport device (1) also comprises at least one sensor device (6, 8, 11) signal-coupled to a motor-driven actuator (14) assigned to the distribution sec-
(Continued)

tion (3) In the event of detected gaps, interruptions, or in the event of a detected termination of the mass flow within the infeed (2) or within the distribution section (3) or within the rows (5), the actuator (14) moves a movable steering device (16) adjoining the mass flow.

14 Claims, 3 Drawing Sheets

(51) Int. Cl.
B65G 47/71 (2006.01)
B65G 47/76 (2006.01)
B65G 47/82 (2006.01)

(52) U.S. Cl.
CPC .......... B65G 47/766 (2013.01); B65G 47/82 (2013.01); *B65G 2203/0241* (2013.01); *B65G 2203/042* (2013.01)

(56) References Cited

U.S. PATENT DOCUMENTS

| | | | |
|---|---|---|---|
| 5,768,860 A | 6/1998 | Weaver | |
| 7,232,026 B2 | 6/2007 | Heuft et al. | |
| 7,880,909 B2* | 2/2011 | Bukowski | H04L 67/56 |
| | | | 358/1.15 |
| 8,668,073 B2* | 3/2014 | Petrovic | B65G 47/682 |
| | | | 198/452 |
| 8,770,909 B2* | 7/2014 | Parker | B65G 57/03 |
| | | | 901/41 |
| 9,145,265 B2* | 9/2015 | Kalkhoff | B65B 57/16 |
| 9,505,562 B2* | 11/2016 | Petrovic | B65G 37/00 |
| 9,663,305 B2* | 5/2017 | Papsdorf | B65G 54/02 |
| 9,878,854 B2* | 1/2018 | Walter | B65G 47/682 |
| 10,322,833 B2* | 6/2019 | Hutter | B65B 57/14 |
| 10,336,557 B2 | 7/2019 | Wittmann et al. | |
| 2006/0070927 A1 | 4/2006 | Henry | |
| 2015/0274439 A1 | 10/2015 | Goudy et al. | |
| 2018/0345520 A1* | 12/2018 | Eckhardt | B26D 5/00 |
| 2019/0014799 A1 | 1/2019 | Hahn et al. | |

FOREIGN PATENT DOCUMENTS

| | | |
|---|---|---|
| DE | 69900132 | 7/2001 |
| DE | 102011009181 A1 | 7/2012 |
| DE | 102018124216 A1 | 4/2020 |

OTHER PUBLICATIONS

PCT Application: PCT/EP2021/065420 filed Jun. 9, 2021—International Search Report dated Sep. 16, 2021.
PCT Application: PCT/EP2021/065420 Filed Jun. 9, 2021—International Preliminary Report of Patentability dated Feb. 9, 2023.

* cited by examiner

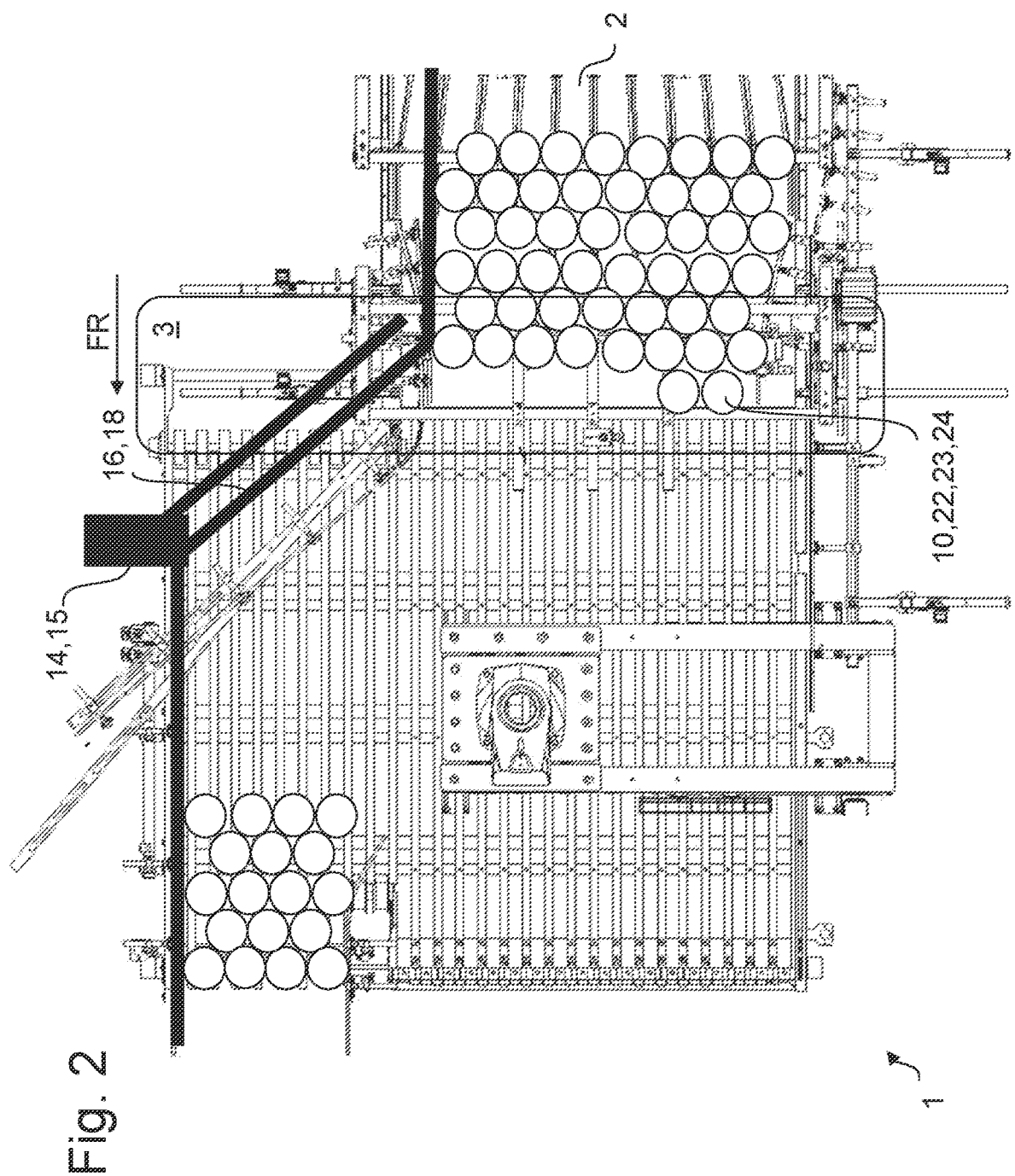

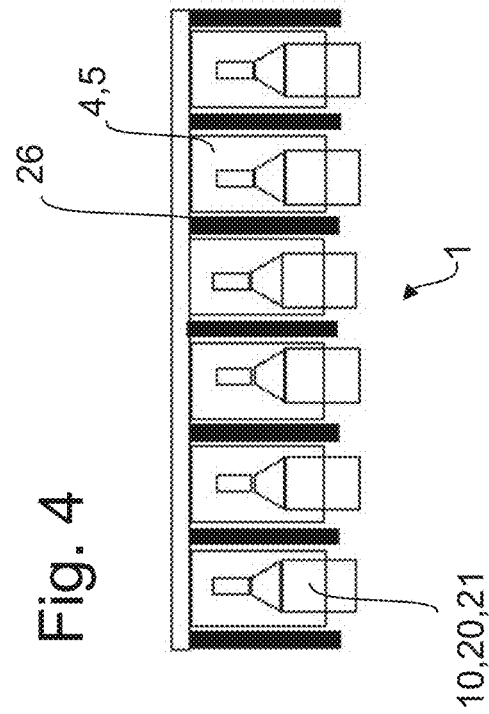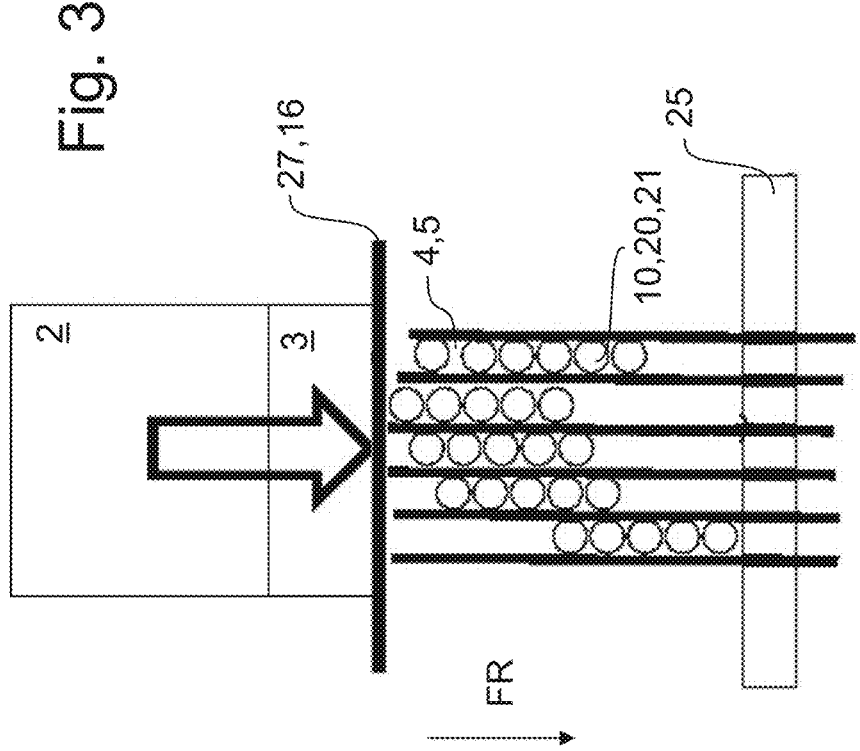

TRANSPORT DEVICE AND METHOD FOR DISTRIBUTING A PLURALITY OF SIMILARLY SHAPED AND DIMENSIONED ARTICLES

CLAIM OF PRIORITY

The present application claims priority to International Application PCT/EP2021/065420 filed Jun. 9, 2021, which in turn claims priority to German Application DE 10 2020 120 336.5 filed Jul. 31, 2020, which are incorporated by reference.

FIELD OF THE INVENTION

The present invention relates to a transport device having an infeed for conveying a plurality of similarly shaped and dimensioned articles, and to a method for distributing a plurality of similarly shaped and dimensioned articles in accordance with the features of the independent claims.

BACKGROUND OF THE INVENTION

In container treatment facilities, which can be designed, for example, as so-called bottle filling lines, several treatment machines usually follow one another in the conveying direction of the containers or bottles. Such treatment machines can be used, for example, for cleaning, inspecting, filling, labeling and packing the containers. The above-mentioned or other treatment machines are usually connected by transport devices to one another and to form an overall facility.

The transport devices connecting the individual treatment machines generally also serve as multi-lane buffer sections and each feature defined storage volumes in order to be able to buffer any operating faults that occur at individual treatment machines without having to temporarily shut down the entire container treatment facility in each case, provided that these operating faults are short-lived.

Methods for changing the operation of a container treatment facility from a first operating mode to a second operating mode are known from the prior art. This includes, for example, a changeover of the container treatment facility from a first sort of article or container to a second sort of article or container. Also, different types of treatment, such as selected temperature or product to be filled or the like, are known from the prior art.

Up to now it has been common practice that a large number of necessary changeovers are to be carried out manually by an operator when the container treatment facility is converted from a first operating mode to a second operating mode, in particular the emptying of the container treatment machines within a container treatment facility. Such a changeover is usually very time-consuming, since the operator may have to alternate between several container treatment machines of the container treatment facility in order to make the necessary changeovers.

One problem when emptying the container treatment machines consists, in particular, of individual containers stopping at wide, non-driven transition areas, in particular at the so-called shard discharges or similar, and thus remaining within the container treatment machines. These containers have to be moved or removed manually by the operator to ensure an even distribution, this considerably increases the time required for a product changeover and thus reduces possible production times.

The utility model specification DE 92 04 040 U1 describes a transport device for containers standing upright, with a multi-lane infeed conveyor, a likewise multi-lane outfeed conveyor adjoining in the conveying direction and a connecting transfer device. The transfer device features several transfer sections arranged in an offset manner, each extending in the conveying direction and only over a part of the width of the infeed conveyor and the outfeed conveyor, which are preceded by guide means.

A method for a changeover of an operation mode of a container treatment machine is described in the patent specification EP 3 402 722 B1. Hereby, a sensor detects the last containers, which are to be treated with a first operating mode, and outputs an indicative signal, based on which signal a transfer device transports the containers treated by the first operating mode to a transport device at the outlet of the container treatment machine.

The task of the invention is to improve the uniform distribution of articles or containers when emptying a container treatment facility, in particular, to reduce the effort and time factor involved during a product changeover.

SUMMARY OF THE INVENTION

The above task is solved by a transport device as well as by a method for distributing a plurality of similarly shaped and dimensioned articles, comprising the features of the independent claims. Further advantageous embodiments are described by the respective dependent claims.

The invention relates to a transport device with an infeed for conveying a plurality of similarly shaped and dimensioned articles in a mass flow. The articles preferably consist of beverage containers, for example, returnable beverage containers in the form of glass bottles or disposable beverage containers in the form of plastic bottles, cans or other suitable containers.

The transport device comprises a distribution section located downstream of the infeed, which distribution section leads in the conveying direction of the articles into a row transport. In particular, it is provided that the articles are distributed within the distribution section according to the existing rows in the row transport, so that the articles can subsequently be conveyed further onwards or transported away in at least two parallel rows separated from each other.

Furthermore, at least one sensor device is assigned to the transport device. This at least one sensor device is assigned to the infeed, the distribution section or the rows of the row transport. The at least one sensor device serves, in particular, to detect and monitor the mass flow within the infeed, within the distribution section or the articles within the rows, which articles are conveyed successively in at least two parallel rows.

Optionally, several sensor devices can also be assigned to the transport device, whereby these several sensor devices can optionally be assigned to the infeed, the distribution section and/or the rows of the row transport. As with the case of only a single sensor device being present, the optionally present multiple sensor devices also serve in the same way to detect and monitor the mass flow within the infeed, within the distribution section and/or the articles within the rows, which articles are conveyed successively in at least two parallel rows.

The at least one sensor device can be formed, for example, by a light barrier arrangement. Other sensor principles are also conceivable and can be used in practice, such as mechanically operating push buttons, ultrasonic detection devices or camera arrangements with downstream image evaluation.

In ongoing production operation, the articles are each conveyed directly one after the other without interruption, so that the light beam of the optionally usable light barrier arrangement is permanently interrupted. If, on the other hand, the receiver of the light barrier arrangement detects a signal generated by the transmitter, this is a sign that gaps have occurred between the articles because fewer articles are following or because an interruption or termination of the product flow is taking place. In particular, this is a sign of an upcoming product change, in which the previously conveyed articles will be replaced by other articles. Since such a product change should, on the one hand, trigger the shortest possible downtimes or ideally no interruption at all, and on the other hand, as few articles as possible should be removed, it makes sense to detect the product flow by sensors.

According to an alternative embodiment, the at least one sensor device can also be formed by a camera with corresponding image evaluation, which detects the presence of the articles within the infeed or within the distribution section or within the row transport and, in particular, which detects gaps between the articles or a shortage of articles.

When using image processing it may be useful, if necessary, to constantly check and adjust the control settings for the actuator in order to obtain a self-learning system.

In current production operation, there is an uninterrupted mass flow, in which the articles are transported in a closely packed manner, with essentially no gaps existing between the articles. This transport of the articles can show a constant accumulation pressure.

If, on the other hand, a product change is upcoming, no more articles are fed into the container treatment facility and the mass flow fades out, i.e. the number of articles conveyed via the transport device decreases and gaps form between the articles. In particular, gaps form between articles within the infeed and/or within the distribution section, often causing the articles to be distributed unevenly among the rows, which in turn causes gaps to form between the articles transported one after the other within the rows.

In such a case, there is a risk of situations, in which situations individual rows will still be filled with articles, while due to the lack of accumulation pressure within individual areas of the article flow other rows remain empty or are no longer regularly and uninterruptedly filled with articles. In such a case, any subsequent grouping is significantly impaired, if, for example, a gripper head is to seize a defined number of articles from the parallel rows. If individual rows now only feature fillings with gaps, while other rows are still filled with articles, this leads to insufficient or incorrect article grouping, in order that such gapped groupings are no longer suitable for acquisition by a gripper head with a regular arrangement of individual gripping devices.

In the transport device according to the invention, it is provided, that the at least one sensor device is signal-coupled with a motor-driven actuator, which actuator is assigned to the distribution section. The actuator is designed to influence a transverse distribution of the articles within the transport device, in particular within the distribution section. This occurs, in particular, when the at least one sensor device has detected gaps, interruptions or a termination of the article flow within the infeed, within the distribution section or within the rows. In this case, the actuator moves a movable steering device, which steering device is adjoining the article flow at least on one side.

By influencing the transverse distribution of the articles within the distribution section by the steering device, a uniform distribution of the articles within the subsequent rows of the row transport is achieved. Preferably, this results in a largely homogeneous distribution of the articles within the rows.

According to one embodiment of the invention, it is provided, that the steering device is designed to be pivotable, rotatable or displaceable in order to engage with the flow of articles having gaps or in order to intervene within the flow of articles having gaps.

The actuator is, for example, a rotating mechanism or a pivoting mechanism, by which the steering device, which is formed, for example, by a rotatable or pivotable pushing beam or the like, can be moved in a desired direction by an electric motor or another suitable drive, in order to at least partially deflect the flow of articles.

The actuator can also be formed by a robot, which robot, for example, correspondingly moves a steering device formed by a rigid railing. One embodiment can provide that the robot comprises a tool or that a tool can be assigned to the robot, with which tool individual articles from the article flow can be seized and can be specifically assigned to individual rows of the row transport. Thereby, particularly when there are only few remaining articles, the rows of the row transport can be served in a targeted manner to ensure a homogeneous article distribution.

One embodiment of the invention provides that the distribution section is formed by a passive, non-driven transport section. Here, the steering device is preferably designed as a pushing element, comprising a movement component, which movement component is in or against the conveying direction. In this way, the pushing element movable in the conveying direction can replace the missing accumulation pressure of subsequently following articles, thereby causing a movement of the articles over the distribution section in the direction of the row transport, whereby the articles are distributed simultaneously and preferably evenly into the rows.

In this case, it can be provided, that during ongoing production operation the steering element is arranged, for example, above the transport device. In order to push the articles over the distribution device and thereby influence the transverse distribution of the articles, the steering element can be pivoted downward into the article stream.

During the displacement of the articles in the conveying direction, the steering element can, for example, be arranged perpendicular to the conveying direction of the articles. However, in order to influence the transverse distribution of the articles, it can also be advantageous if, during the displacement of the articles in the conveying direction, the steering element is arranged at a narrow angle to the conveying direction of the articles.

A further embodiment may provide for the use of at least two sensor devices, wherein, for example, a first sensor device is assigned to the infeed and wherein a second sensor device is assigned to the rows of the row transport. Preferably, the first sensor detects a shortage of articles within the infeed, whereupon the actuator assigned to the distribution section is controlled and the steering device is moved accordingly. The further sensor serves, in particular, to check the correction of the transverse distribution of the articles by the steering device, and the data determined by the second sensor device provide signals that serve to fine-tune the actuator and the steering device.

The control of the steering device can also be done by a closed-loop control, whereby the success of the equalization of the article flow can be constantly checked by the sensor device. Each effect or each improvement of the distribution of the articles into the parallel rows can thus be used directly for further control of the actuator and thus the movement of the steering device.

The invention further relates to a method for distributing a plurality of similarly shaped and dimensioned articles into a row transport, which articles are conveyed in a mass flow via an infeed, in which row transport the articles are conveyed onward or transported away in at least two parallel rows, which rows are separated from one another, wherein the article flow within the infeed or within a distribution section formed between the infeed and the rows or within the rows is being detected and monitored by sensors.

If gaps, interruptions or a termination of the article flow are detected within the infeed, within the distribution section or within the rows, then in the method according to the invention a transverse distribution of the conveyed articles is influenced within the distribution section by at least one motor-driven actuator, which comprises or moves a movable steering device, which steering device is adjoining the article flow at least on one side. In particular, the articles are thereby distributed largely evenly or homogeneously into the rows of the row transport.

If, during the sensory monitoring of the article flow, it is determined that no articles or containers of a first sort are subsequently following, an influencing of the filling of the individual rows of the row transport can take place. The detection of the article flow can be done by measuring or counting the articles or containers in each lane within the packer infeed, so that a filling up of lesser occupied lanes within the packer infeed can be executed immediately afterwards.

Optionally, in the area of the distribution section and preferably extending into the row transport, several parallel-driven conveyor belts may be present for the article transport, each of which conveyor belt can be driven at a different speed, which can also have the desired effect of approximately equal distribution of the articles into the parallel rows of the row transport.

In particular, in the method described here for distributing articles and the corresponding transport device, it is envisaged that a more uniform distribution of the remaining containers within the container treatment facility is achieved by additional manipulation of the articles or containers, in particular in critical transition areas. Preferably, a filling condition of conveyed articles or containers is detected, for example, in an area of the container treatment facility, in which area the containers being transported are arranged in lanes. If a shortage of following articles or containers is detected, then a movably designed manipulator is controlled to affect a most homogeneous distribution of the following articles or containers within the lanes.

In particular, at least one article or container or even several articles or containers are moved accordingly by a rotatable or swiveling manipulator or by a pusher or the like in the direction of the lanes to be filled. This enables a saving of time required for the changeover of the container treatment facility, thereby increasing production times and thus the efficiency of the container treatment facility, since phases with undefined filling or phases with different container variants, which variants are not to be packed together, can be minimized.

One embodiment of the container treatment facility, in which container treatment facility, in particular, disposable beverage containers are processed, comprises, for example, a container dividing unit and a carton feeder and a pack forming unit, or a container dividing unit and a film wrapping unit, as well as a shrinking device. Hereby, for example, a motorized manipulation of the railings is provided at the infeed to the container dividing unit to assist with the entering and the distribution of the remaining containers at the end of a sort during a sort changeover.

Preferably, a rigid lateral railing, which railing is designed to be movable, is moved with the aid of a robot so that thereby the last containers of one sort are pushed to be located centrally in front of the dividing lanes. The railing can be, for example, rotatably mounted at a point D in a suspending manner. However, the railing can also be designed to be slidable or otherwise moveable. Thereby, the remaining containers are distributed at least largely homogeneously within the lanes of the container divider.

In addition, in a final phase in which only a few containers are still entering by the container infeed, a robot or other manipulator with a suitable tool can distribute individual bottles or containers in such a way that, as far as possible, all the lanes of the container infeed are served evenly, so that complete packs can be produced for as long as possible without the requirement for manual intervention by an operator when sorts are changed at the infeed.

In this context it may be provided, that the container supply is monitored by sensors. If this sensory monitoring reveals a shortage of containers, then it can be provided, in particular, that the transport speed in the transfer area is increased for container distribution. For example, the transport speed can be increased to twice the basic speed. As a result, more containers are fed to the container infeed area in time to continue filling its lanes sufficiently and thus to produce the final packs with the remaining containers before sort changeover, this being done without the containers having to be distributed manually by an operator to the corresponding lanes of the container infeed area.

An embodiment of the container treatment facility, in which embodiment, in particular, returnable beverage containers in the form of bottles or similar are processed, can, for example, have the problem that returnable beverage containers have to be pushed over non-driven areas within the infeed to the container treatment facility. Such areas can often also be designed as so-called shard discharge. In the case of a product change, the lack of accumulation pressure from the subsequently following bottles causes these last bottles to stop in the non-driven areas. In this case, the bottles can be manipulated by a pusher that pushes the bottles over the non-driven areas and, in particular, distributes them into the lanes at the same time.

It should be expressly mentioned at this point that all aspects and embodiments which have been explained in connection with the transport device according to the invention equally concern or can be partial aspects of the method according to the invention. Therefore, if at any point in the description or also in the claim definitions concerning the transport device according to the invention reference is made to certain aspects and/or contexts and/or effects, this applies equally to the method according to the invention. The same applies in reverse, so that all aspects and embodiments explained in connection with the method according to the invention also equally relate to or can be partial aspects of the transport device according to the invention. Therefore, if at any point in the description or also in the claim definitions concerning the method according to the invention, reference is made to certain aspects and/or interrelationships and/or effects, this equally applies to the transport device according to the invention.

BRIEF DESCRIPTION OF THE FIGURES

In the following, examples of embodiments will explain the invention and its advantages in more detail with reference to the attached figures. The size ratios of the individual elements to each other in the figures do not always correspond to the real size ratios, since some shapes are simplified and other shapes are shown enlarged in relation to other elements for better illustration.

FIG. 2 shows a second embodiment of a transport device according to the invention.

FIG. 3 shows a third embodiment of a transport device according to the invention.

FIG. 4 shows another view of the third embodiment of the transport device according to FIG. 3.

DETAILED DESCRIPTION OF THE INVENTION

Figure 1:
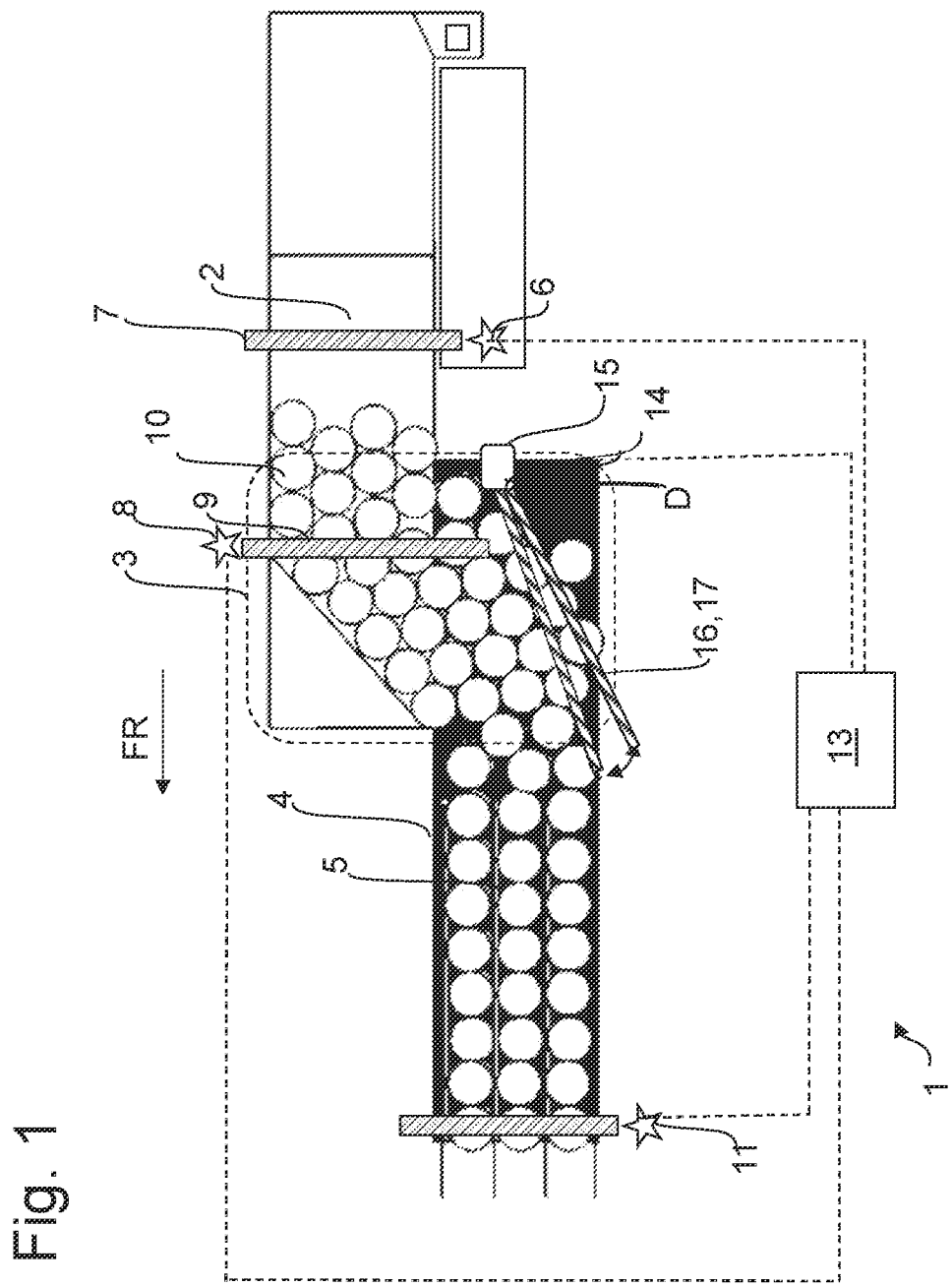
FIG. 1 shows a first embodiment of a transport device according to the invention.

Identical reference signs are used for elements of the invention that are identical or have the same effect. Furthermore, for the sake of clarity, only reference signs that are necessary for the description of the respective figures are shown in the individual figures. The embodiments shown are merely examples of how the invention can be designed and do not represent a conclusive limitation. Also, the features described below are in each case not to be understood in close connection with further features of the respective embodiment, but can in each case be provided in the general context or find use therefor.

The schematic top view of FIG. 1 shows a first embodiment of a transport device 1 or a section of such a transport device 1. The section of the transport device 1 shown here comprises an infeed 2, via which infeed 2 a plurality of similarly shaped and dimensioned articles 10 are conveyed in a mass flow in a conveying direction FR.

Downstream of this infeed 2, a distribution section 3 is provided for the articles 10, which distribution section 3 leads into a row transport 4 for the articles 10. In particular, in the embodiment shown, the articles 10 are distributed into three parallel rows 5 and are moved within these parallel rows 5 further in the conveying direction FR, thereby being arranged one after the other and laterally separated from each other.

For example, a first sensor 6 with a first detection area 7 can be assigned to the infeed 2, which first sensor 6 detects the presence of articles 10 within the infeed 2.

Alternatively, or additionally, a second sensor 8 with a second detection area 9 may be associated with the distribution section 3, which second sensor 8 detects the presence of articles 10 within the distribution section 3.

Furthermore, a third sensor 11 with a third detection area 12 may alternatively or additionally be associated with the row transport 4, which detects the presence of articles 10 within the rows 5.

When, in preparation of a product change, the flow of articles decreases, gaps form between the articles 10 within the infeed 2 and/or within the distribution section 3. As a result, the articles 10 are distributed unevenly among the rows 5 and gaps form between the articles 10, which articles 10 are transported one after another within the rows. These gaps are each detected by the respective sensor 6, 8, 11 or by the sensors 6, 8 and/or 11.

The first, second and/or third sensor 6, 8 and/or 11 can, for example, each be formed by a light barrier arrangement. During ongoing production operation, the articles 10 are conveyed in direct succession without interruption, so that the light beam of the light barrier arrangement is permanently interrupted. If, on the other hand, the receiver of the light barrier arrangement detects a signal generated by the transmitter, this is a sign that gaps have formed between the articles 10 because fewer articles 10 are subsequently entering. In particular, this is a sign of an upcoming product change.

According to an alternative embodiment, the first, second and/or third sensor 6, 8, 11 can also be formed by a camera with corresponding image evaluation, which detects the presence of the articles 10 within the infeed 2 or within the distribution section 3 or within the row transport 4.

The at least one sensor 6, 8, 11 is coupled in terms of signals, in particular, via a control unit 13 to a motor-driven actuator 14, which actuator 14 is assigned to the distribution section 3 for influencing a transverse distribution of the articles 10. If a gap or an interruption in the article flow is detected by at least one sensor 6, 8, 11, then the actuator 14 is controlled in order to deflect the article flow by a movable steering device 16, which steering device 16 is adjoining the article flow at least on one side, in order thus to achieve an equal distribution of the articles 10 within the rows 5.

Such a redirection of the article flow can also be achieved, for example, by oscillating movements of the steering device 16, as hinted by the double arrow assigned to the steering device 16.

The actuator 14 is, for example, a rotating mechanism driven by an electric motor 15 or a pivoting mechanism, by which the steering device 16, which is formed, for example, by a pivoting pushing beam 17 or the like, can be moved in a desired direction in order to at least partially deflect the flow of articles.

By this additional manipulation of the articles 10 within the distribution section 3 results in a more uniform distribution of the remaining articles within the container treatment facility, especially within the subsequent row transport and further subsequent container treatment devices.

If a shortage of subsequently following articles 10 is detected by at least one of the sensors 6, 8, 11 within the infeed 2 and/or within the distribution section 3 and/or within the row transport 4, then the movable steering device 16 is controlled in such a way that the most homogeneous distribution of the following articles 10 which is possible within the rows 5 is achieved. In particular, hereby at least one article 10 is moved correspondingly by the rotatable or swiveling pushing beam 17 into the direction of the respective rows 5 to be filled.

In particular, it is provided, that the pushing beam 17 is rotatably mounted at a point D in a suspended manner. This enables time to be saved during a changeover of the container treatment facility, which increases the production times and thus the efficiency of the container treatment facility.

The schematic top view of FIG. 2 shows a second embodiment of a transport device 1, in which, in particular, disposable beverage containers 22 are processed, in particular disposable bottles 23 or cans 24.

A container treatment facility with such a transport device 1 comprises an infeed 2, via which infeed 2 the articles 10 are fed in a disordered mass flow 30. Within the transport device 1, the articles 10 are transferred via suitable devices (not shown) into an ordered mass flow 32, which ordered mass flow 32 is subsequently fed, for example, to an article divider with a row transport (not shown) and furthermore to a carton feed and pack forming unit (not shown) or a film wrapping unit and a shrinking device (not shown).

Hereby, the steering device 16 is formed by a railing 18, which railing 18 can be moved by motor. In particular, the electric motor 15 thus forms the actuator 14. For example, the motorized manipulation of the railing 18 is provided at the infeed to the area of the ordered mass flow 32 and serves to assist with the entering and the distribution of the remaining articles 10 into the ordered mass flow 32 at the end of a sort during a planned sort changeover.

Alternatively, it may be provided, that a rigid lateral railing 18 can be moved by a robot (not shown) so as to push the last articles 10 of one sort to be located centrally in front of the area of the ordered mass flow 32. The railing 18 may alternatively be rotatably mounted at a point in a suspended manner (not shown). However, the railing 18 can also be designed to be movable in another way. In this way, the remaining articles 10 are distributed homogeneously into the ordered mass flow 32.

In addition, at a final stage when only a few articles 10 are still entering the ordered mass flow 32, a robot or other manipulator with a suitable tool can selectively distribute individual bottles or articles 10 to produce the ordered mass flow 32, in order that complete packs can be produced for as long as possible without the requirement of a manual intervention by an operator at the infeed 2 or within the distribution section 3 during the sort change.

Hereby, too, sensory monitoring within the area of the infeed 2, within the distribution section 3 and/or within the ordered mass flow 32 is advantageous. If this sensory monitoring reveals a shortage of articles 10, then it can be provided, in particular, that the transport speed within the distribution section 3 is increased. Thus, it can be useful to increase the transport speed significantly and to increase it, for example, to approximately twice the basic speed. As a result, more articles 10 are entering again into the ordered mass flow 32 in due time to continue to sufficiently fill the mass flow 32 and thus to finally produce packs with the remaining articles 10 before the sort change, without the articles 10 having to be distributed manually by an operator into the ordered mass flow 32.

The schematic top view of FIG. 3 shows a third embodiment of a transport device 1, as used, in particular, in container treatment facilities, in which container treatment facilities articles 10 formed by returnable beverage containers 20 are processed.

The front view of FIG. 4 shows a further view of a third embodiment of the transport device 1 according to FIG. 3.

The returnable beverage containers 20 are, for example, formed by glass bottles 21 or the like.

Within the area of an infeed 2 of the container treatment facility these have to be pushed over non-driven areas, which are referred to, for example, as the shard discharge 25. FIG. 4 shows the row transport 4 of bottles 21 within rows 5, which are separated from each other by lane plates 26.

In the case of a product change, this leads to the last bottles 21 stopping in the non-driven areas due to the lack of accumulation pressure, which is caused by the absence of subsequently following bottles 21. In this case, a manipulation of the bottles 21 can be executed by a pusher 27 assigned to the distribution section 3, which pusher 27 forms the steering device 16 for the bottles 21 and which is moved accordingly by a suitable actuator (not shown). The pusher 27 pushes the bottles 21 over the non-driven areas of the distribution section 3, whereby the bottles 21 are distributed simultaneously and preferably evenly into the rows 5.

In this case, it is provided too, that the presence of bottles 21 within the infeed 2, within the distribution area 3 and/or within the row transport 4 is monitored by sensors and the steering device 16 is controlled accordingly on the basis of the data determined by the sensors.

The embodiments, examples and variations of the preceding paragraphs, the claims or the following description and the figures, including their various views or respective individual features, may be used independently or in any combination. Features described in connection with one embodiment are applicable to all embodiments unless the features are incompatible.

Although the above description of figures generally refers to "schematic" representations and views, this in no way means that the representations in the figures and their description are to be of secondary importance with respect to the disclosure of the invention. The person skilled in the art is quite capable of retrieving enough information from the schematically and abstractly drawn representations to facilitate his understanding of the invention without being impaired in any way in his understanding, for example, from the drawn and possibly not exactly to scale size ratios of the articles 10 and/or parts of the transport device 1 or other drawn elements. The figures thus enable the skilled person as reader to derive a better understanding of the idea of the invention formulated in a more general and/or abstract manner in the claims as well as in the general part of the description on the basis of the implementations of the method according to the invention explained more in detail and the mode of operation of the transport device according to the invention explained more in detail.

The invention has been described with reference to a preferred embodiment. However, it is conceivable to one skilled in the art that variations or modifications of the invention may be made without departing from the scope of protection of the claims below.

LIST OF REFERENCE SIGNS 1 transport device
2 Infeed
3 distribution section
4 row transport
5 Row
6 first sensor, first sensor device
7 first detection area
8 second sensor, second sensor device
9 second detection area
10 Article
11 third sensor, third sensor device
12 third detection area
13 control unit
14 Actuator
15 electric motor
16 steering device
17 pushing beam
18 Railing
20 reusable beverage containers
21 (reusable) bottles
22 disposable beverage containers
23 (disposable) bottles
24 Cans
25 shard discharge
26 lane plate 27 pusher
30 disordered mass flow
32 ordered mass flow
D pivot point
FR conveying direction

The invention claimed is:

1. A transport device (1) comprising:
an infeed (2) for conveying a plurality of similarly shaped and dimensioned articles (10) in a mass flow,
a distribution section (3) located downstream of the infeed (2),
a row transport (4), wherein the distribution section (3) leads into the row transport (4), where the plurality of articles (10) are conveyed onwards in at least two parallel rows (5), which rows (5) are separated from one another by one or more lane plates (26) in the row transport (4);
at least one sensor device (6, 8, 11) assigned to the infeed (2), to the distribution section (3), or to the rows (5) for detecting and monitoring the mass flow within the infeed (2), within the distribution section (3), or within the rows (5), which at least one sensor device (6, 8, 11) is coupled in terms of signals to a motor-driven actuator (14) assigned to the distribution section (3),
wherein, in the event of detected gaps, or interruptions, or in the event of a detected termination of the mass flow within the infeed (2), within the distribution section (3), or within the rows (5), the actuator (14) moves a movable steering device (16) adjoining the mass flow at least on one side.

2. The transport device (1) of claim 1, wherein the steering device (16) is designed to be pivotable, rotatable, or displaceable.

3. The transport device (1) of claim 2, wherein the actuator (14) is a robot.

4. The transport device (1) of claim 3, in which the robot comprises a tool or in which a tool can be assigned to the robot, which tool is designed to seize individual articles (10) from the mass flow and to assign them to individual rows (5).

5. The transport device (1) of claim 1, in which the distribution section (3) is formed by a passive and non-driven transport section, wherein the steering device (16) is a movably designed pushing element with a movement component, which movement component is in or against a conveying direction (FR).

6. The transport device (1) of claim 1, wherein the at least one sensor device (6, 8, 11) comprises a light barrier.

7. The transport device (1) of claim 1, wherein the at least one sensor device (6, 8, 11) comprises at least one camera with image processing or evaluation.

8. A method of distributing a plurality of similarly shaped and dimensioned articles (10), comprising:
conveying articles (10) in a mass flow via an infeed (2) to a row transport (4) to form at least two parallel rows (5), which rows (5) are separated from one another by one or more lane plates (26),
detecting, with at least one sensor, the mass flow within the infeed (2), within a distribution section (3) located between the infeed (2) and the rows (5), or within the rows (5), and
moving, in the event of detected gaps, or interruptions, or in the event of a detected termination of the mass flow within the infeed (2), within the distribution section (3), or within the rows (5), at least one motor-driven actuator (14), wherein the actuator (14) comprises, or moves, a movable steering device (16), wherein the steering device (16) adjoins the mass flow at least on one side.

9. The method of claim 8, further comprising distributing the articles (10) evenly or approximately evenly into the rows (5) of the row transport (4) by the steering device (16).

10. The method of claim 8, further comprising pivoting, rotating, or displacing the steering device (16) by control movements of the actuator (14).

11. The method of claim 8, further comprising moving the steering device (16) by a robot in order to change a direction of movement of articles (10) of the mass flow.

12. The method of claim 8, further comprising seizing individual articles (10) from the mass flow and assigning seized articles (10) to individual rows (5).

13. The method of claim 8, wherein the detecting step comprises detecting characteristics of individual or multiple articles.

14. A transport device (1) comprising:
an infeed (2) for conveying a plurality of similarly shaped and dimensioned articles (10) in a mass flow in a conveying direction (FR),
a distribution section (3) located downstream of the infeed (2) and formed by a passive and non-driven transport section,
a row transport (4), wherein the distribution section (3) leads into the row transport (4), where the plurality of articles (10) are conveyed onwards in the conveying direction (FR) in at least two parallel rows (5) in the row transport (4), which rows (5) are separated from one another;
at least one sensor device (6, 8, 11) assigned to the infeed (2), to the distribution section (3), or to the rows (5) for detecting and monitoring the mass flow within the infeed (2), within the distribution section (3), or within the rows (5), which at least one sensor device (6, 8, 11) is coupled in terms of signals to a motor-driven actuator (14) assigned to the distribution section (3),
wherein, in the event of detected gaps, or interruptions, or in the event of a detected termination of the mass flow within the infeed (2), within the distribution section (3), or within the rows (5), the actuator (14) moves a movable steering device (16) adjoining the mass flow at least on one side, wherein the steering device (16) is a movably designed pushing element with a movement component, which movement component is in or against the conveying direction (FR).

* * * * *